United States Patent
Muramatsu et al.

(10) Patent No.: US 8,026,831 B2
(45) Date of Patent: Sep. 27, 2011

(54) WEATHER INFORMATION NOTIFICATION APPARATUS AND PROGRAM FOR THE SAME

(75) Inventors: Satoru Muramatsu, Kariya (JP); Yoshihiko Sugawara, Anjo (JP)

(73) Assignee: DENSO CORPORATION, Kariya (JP)

( * ) Notice: Subject to any disclaimer, the term of this patent is extended or adjusted under 35 U.S.C. 154(b) by 290 days.

(21) Appl. No.: 12/379,785

(22) Filed: Feb. 27, 2009

(65) Prior Publication Data
US 2009/0224943 A1 Sep. 10, 2009

(30) Foreign Application Priority Data
Mar. 4, 2008 (JP) ................................. 2008-053037

(51) Int. Cl.
*G08G 1/09* (2006.01)

(52) U.S. Cl. .......... 340/905; 340/601; 701/25; 701/200; 702/3

(58) Field of Classification Search .................. 340/905, 340/601; 701/200, 119, 204, 25, 201; 715/764; 702/3
See application file for complete search history.

(56) References Cited

U.S. PATENT DOCUMENTS

| 7,161,502 B2 * | 1/2007 | Yamada et al. ............ 340/995.1 |
| 7,751,978 B1 * | 7/2010 | Neilley et al. ...................... 702/3 |
| 2008/0180282 A1 * | 7/2008 | Brosius .................... 340/995.27 |
| 2009/0312943 A1 * | 12/2009 | Kelly et al. .................... 701/204 |

FOREIGN PATENT DOCUMENTS

| JP | A-2003-121172 | 4/2003 |
| JP | A-2003-330933 | 11/2003 |
| JP | 2005-181272 A | 7/2005 |
| JP | 2005-315659 A | 11/2005 |
| JP | 2006194795 A * | 7/2006 |
| JP | A-2006-194795 | 7/2006 |
| JP | A-2007-271481 | 10/2007 |

OTHER PUBLICATIONS

Notification of Reasons for Refusal mailed on May 18, 2010 issued from the Japanese Patent Office in the corresponding Japanese patent application No. 2008-053037 (and English translation).

* cited by examiner

*Primary Examiner* — Toan N Pham
(74) *Attorney, Agent, or Firm* — Posz Law Group, PLC

(57) ABSTRACT

A weather information notification apparatus mounted to a vehicle is disclosed. The weather information notification apparatus includes: an acquisition section that cyclically acquires information about weather at a point; a record section that stores the acquired information about weather at the point in an external storage medium unit; and a notification section that causes an external notification unit to notify information about non-latest weather at the point, the information about non-latest weather at the point being a piece of the information about weather at the point stored in the external storage medium unit.

6 Claims, 3 Drawing Sheets

WEATHER INFORMATION NOTIFICATION APPARATUS AND PROGRAM FOR THE SAME

CROSS REFERENCE TO RELATED APPLICATION

The present application is based on Japanese Patent Application No. 2008-53037 filed on Mar. 4, 2008, the disclosure of which is incorporated herein by reference.

BACKGROUND OF THE INVENTION

1. Field of the Invention

The present invention relates to a weather information notification apparatus and a program for the same, more particularly relates to an in-vehicle navigation apparatus that can provide information about weather at a point of interest and a program for the same.

2. Description of Related Art

There is known an in-vehicle apparatus that acquires and displays information about weather (i.e., weather information). JP-A-2003-330933 discloses a navigation apparatus that searches for points and provides a user with information about all of the search-hit points and further provides information about weather at the search-hit points. The information about weather provided by the above technique is the latest issued one.

It is considered that there may be such needs that a user would like to confirm a weather history of a certain point. Examples of such needs are the followings. When a user wonders which ski resort should be selected as a destination from among multiple ski resorts, a user may would like to confirm a last one-week weather history of each ski resort to make sure a slope condition of the ski resort. In another example, before going to a golf course, a user may would like confirm yesterday weather in the golf course to make sure whether the course is in a wet condition or not.

SUMMARY OF THE INVENTION

In view of the above and other points, it is an objective of the present invention to provide a weather information notification apparatus, an in-vehicle navigation apparatus and a program for the same.

According to a first aspect of the present invention, a weather information notification apparatus mounted to a vehicle is provided. The weather information notification apparatus includes: an acquisition section that cyclically acquires information about weather at a point; a record section that stores the acquired information about weather at the point in an external storage medium unit; and a notification section that causes an external notification unit to notify information about non-latest weather at the point, the information about non-latest weather at the point being a piece of the information about weather at the point stored in the external storage medium unit.

According to the above weather information notification apparatus, it is possible to support such needs that a user would like to confirm past weather at a point.

According to a second aspect of the present invention, there is provided a machine readable program for allowing a computer of a weather information notification apparatus mounted to a vehicle to function as: an acquisition section that cyclically acquires information about weather at a point; a record section that stores the acquired information about weather at the point in an external storage medium unit; and a notification section that causes an external notification unit to notify information about non-latest weather at the point, the information about non-latest weather at the point being a piece of the information about weather at the point stored in the external storage medium unit.

According to the above program, it is possible to support such needs that a user would like to confirm past weather at a point.

According to a third aspect of the present invention, there is provided an in-vehicle navigation apparatus that includes: a storage medium unit; a notification unit; and a control circuit. The control circuit cyclically acquires information about present weather at a point of interest, based on information about present weather in a predetermined area containing the point of interest, the information about present weather in the predetermined area being provided from an external weather information provider apparatus. The control circuit records the acquired information about present weather at the point of interest in the storage medium unit, so that a weather history at the point of interest is stored in the storage medium unit. The control circuit causes the notification unit to provide a user with the weather history at the point of interest stored in the storage medium unit, thereby to assist the user to select a navigation destination.

According to the above in-vehicle navigation apparatus, it is possible to provide a user with a weather history at a point of interest to assist the user to select a navigation destination. Thus, it is possible to improve usability of the navigation apparatus.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Exemplary Embodiment

Figure 1:
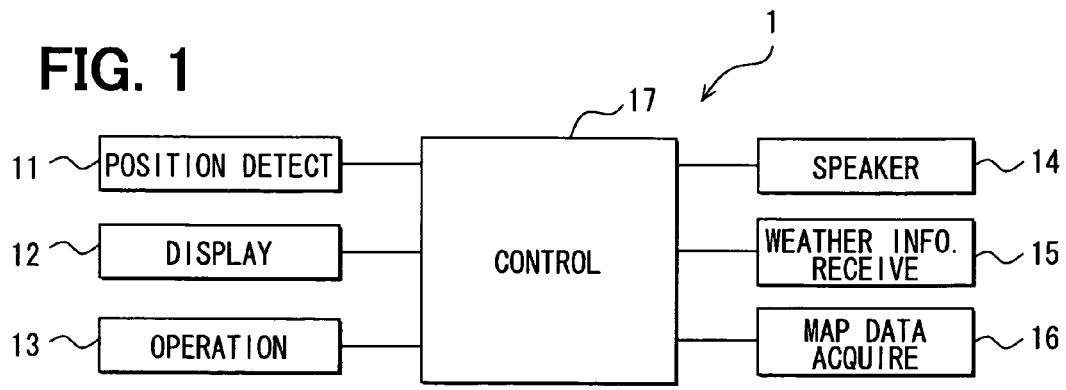
FIG. 1 is a block diagram illustrating a navigation apparatus for a vehicle in accordance with an exemplary embodiment.

FIG. 1 illustrates a hardware configuration of a navigation apparatus 1 for a vehicle in accordance with the present embodiment. Herein, the navigation apparatus 1 for a vehicle, i.e., in-vehicle navigation apparatus 1, is an example of a weather information notification apparatus. The navigation apparatus 1 includes a position detection unit 11, an image display unit 12, an operation unit 13, a speaker unit 14, a weather information reception unit 15, a map data acquisition unit 16, and a control circuit 17.

The position detection unit 11 includes known sensors (not shown) such as a geomagnetic sensor, a gyroscope, a vehicle speed sensor, a GPS receiver and the like. To the control circuit 17, the position detection unit 11 outputs a signal containing information used for specifying a present position, an orientation, and a speed of the vehicle based on characteristics of the above sensors.

The image display unit 12 provides a user with an image based on an image signal outputted from the control circuit 17. The displayed image is for example a map image whose center corresponds to a present location of the subject vehicle.

The operation unit 13 includes an input device. The input device includes multiple mechanical switches arranged on the navigation apparatus 1 and a touch-sensitive panel disposed on a display screen of the image display unit 12. The operation unit 13 outputs a signal to the control circuit 17 in accordance with the pressing down of the mechanical switch by a user and the touching of the touch-sensitive panel.

The weather information reception unit 15 receives information about present weather (i.e., present weather information) via a weather information provider apparatus under control of the control circuit 17, and outputs the received information about the present weather to the control circuit 17. The weather information provider apparatus is located outside of the vehicle equipped with the navigation apparatus 1. The weather information provider apparatus transmits information about the present weather in multiple areas. The multiple areas are also referred to as weather division areas. The weather information provider apparatus is, for example, a satellite broadcast transmission apparatus (e.g., a satellite radio), which transmits the information about the present weather from a satellite orbit.

Of the information about the present weather in multiple weather division areas that is transmitted from the weather information provide apparatus, the weather information reception unit 15 receives some pieces of the information. The weather information reception unit 15 determines which piece of the information is to be received, based on a control signal from the control circuit 17.

The map data acquisition unit 16 includes a non-volatile storage medium, such as CD, DVD, HDD or the like, and a device that can read and possibly write data to the storage medium. The storage medium stores data for programs executed by the control circuit 17, map data for route guidance, data for memory points, and the like.

The map data includes road data, facility data and the like. The road data includes information about links and nodes, and information about connection of links and nodes. The information about links indicates link positions, link types, and the like. The information about the nodes indicates node positions, node types, and the like. The facility data includes multiple records for respective facilities. Each record for a facility indicates a name, a position, an address, and a type etc. of the target facility. The memory point data is data associated with a point that is specified by a user and recorded as a memory point.

The control circuit 17 includes a micro computer having a CPU, a RAM, ROM, and an I/O etc. The control circuit 17 is an example of a computer. The CPU reads a program for an operation of the navigation apparatus 1 from the ROM or the map data acquisition unit 16, and executes the program. In execution of the program, the CPU reads information from the RAM, the ROM and the map data acquisition unit 16, and writes information to the RAM and possibly to the storage medium of the map data acquisition unit 16. Signals are inputted and outputted between: (I) the CPU; and (II) the position detection unit 11, the image display unit 12, the operation unit 13, the speaker unit 14, and the weather information reception unit 15.

The control circuit 17 performs various procedures by executing programs, including: a present position specify procedure; a map display procedure; a navigation route calculation procedure; a route guidance procedure; a memory point registration procedure; a weather information storing setting procedure; a weather information storing procedure; and a memory point display procedure.

In the present position specify procedure, a present position and an orientation of the subject vehicle is specified by using a known map matching technique or the like based on a signal from the position detection unit 11. In the map display procedure, the control circuit 17 causes the image display unit 12 to display a map of a particular area, which is for example a map around the present position of the subject vehicle. In the map display procedure, information used for displaying the map is acquired from the map data.

In the navigation route calculation procedure, the control circuit 17 accepts an input associated with a destination, which may be inputted by a user through operation of the operation unit 13. Further, the control circuit 17 determines the destination in accordance with the input associated with the destination, and calculates an optimum navigation route from the present position to the destination.

The control circuit 17 can employ multiple manners of accepting the input associated with the destination. The multiple manners includes: (1) accepting selection of one memory point from among multiple memory points; (2) accepting the specifying of one point on a map; (3) accepting a name of the destination; (4) accepting a genre of the destination; and (5) accepting a phone number of the destination. In the above (3) to (5) manners, the control circuit 17 retrieves the facility data for a target facility that meets the input (i.e., inputted content), and display all retrieval hit facilities to enable a user to select one of the facilities.

In the route guidance procedure, when the subject vehicle arrives at a guidance point, the control circuit 17 causes the speaker unit 14 to output a guidance sound, and causes the image display unit 12 to display an enlarged view of the guidance point. The guidance point is an intersection for turning right or left, and the guidance sound is one that indicates to turn right or left for example.

In the memory point registration procedure, the control circuit 17 accepts the specifying of a point on a map on the basis of an operation of the operation unit 13 by a user, and records the accepted point as a memory point in the storage medium. The memory point registration procedure employed in the present embodiment may be a known one. In the navigation route calculation procedure, when a predetermined registration operation is performed on the operation unit 13, the control circuit 17 performs the memory point registration procedure so as to record the selected destination as a memory point.

Figure 2:
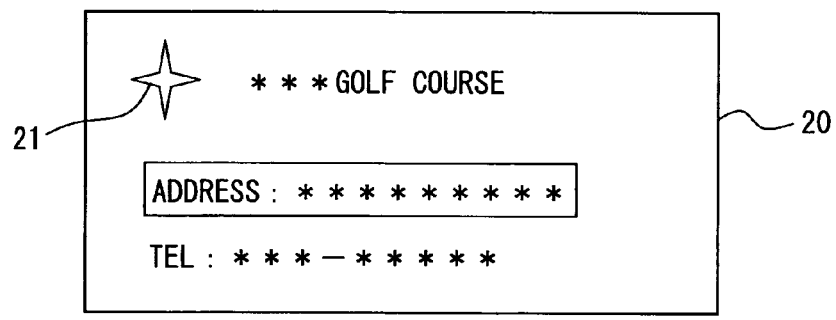
FIG. 2 is a diagram illustrating a first memory point display window that is displayed in registration of a memory point.

In the memory point registration procedure, when one point is recorded as a memory point, the control circuit 17 causes the image display unit 12 to display a memory point display window 20 exemplified in FIG. 2. The memory point display window 20 represents information associated with the registered memory point, such as a name, an address, a phone number and the like. Further, the memory pint display window 20 contains a setting button 21 formed as a selectable item using the operation unit 13. When a user selects the setting button 21, the control circuit 17 starts to execute the weather information storing setting procedure.

In the weather information storing setting procedure, regarding each memory point, it can be determined in line with a user instruction whether information about weather at a memory point is to be recorded and whether information about a weather history (i.e., weather history) at the memory point is to be stored. Further, when it is determined that the weather history at the memory point is to be stored, it is determined how long a time span of the weather history to be stored is.

Figure 3:
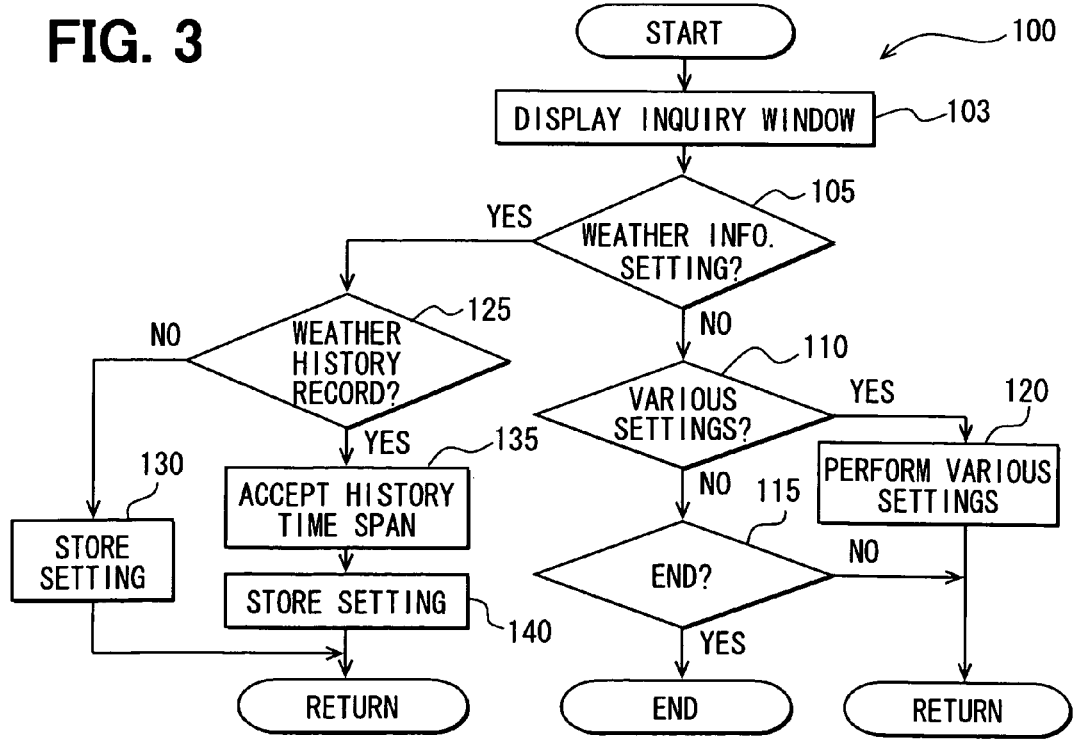
FIG. 3 is a flow chart of a first program executed by a control circuit.
Figure 4:
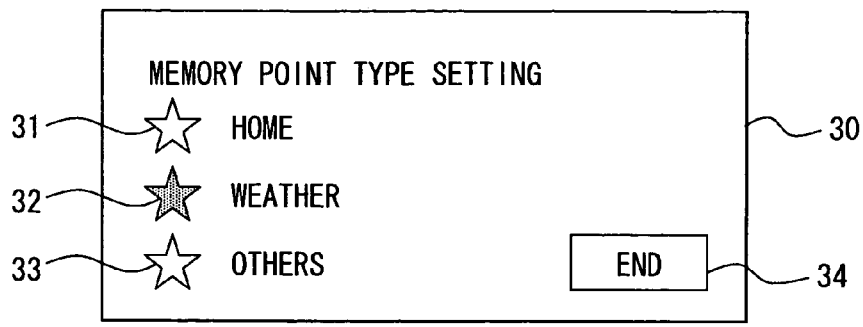
FIG. 4 is a diagram illustrating a memory point type setting window.

To provide the above weather information storing setting procedure, the control circuit 17 executes a program 100 exemplified in FIG. 3 when the weather information storing setting procedure is started. In the execution of the program 100, the control circuit 17 causes at S103 the image display unit 12 to display a memory point type setting window 30 for an inquiry, as exemplified in FIG. 4. The memory point type setting window 30 contains four selectable buttons 31 to 34 (i.e., four selectable information items 31 to 34), which can be selected by a user using the operation unit 13. The four buttons 31 to 34 are a "home" button 31, a "weather" button 32, an "other" button 33, and an "end" button 34, respectively.

After displaying the memory point type setting window 30, process waits until the control circuit 17 receives at S105 an instruction that a setting associated with weather information storing should be performed, or until the control circuit 17 receives at S110 an instruction that various settings should be performed, or until the control circuit 17 receives at S115 an instruction the weather information storing setting procedure should be ended. Issue of the instruction that the setting associated with weather information storing should be performed corresponds to selection of the "weather" button 32. Issue of the instruction that the various settings should be performed corresponds to selection of the "home" button 31 or the "other" button 33. Issue of the instruction that the weather information storing setting procedure should be ended corresponds to selection of the "end" button 34.

When the control circuit 17 receives the instruction that the various settings should be performed, corresponding to "YES" at S110, the control circuit 17 performs at S120 a process in accordance with the instruction. For example, when the home button 31 is selected, the control circuit 17 allows the storage medium of the map data acquisition unit 16 to store information indicating that the memory point registered in the last time corresponds to a home of a user. After S120, the control circuit 17 executes the program 100 from S103 again. When the control circuit 17 receives the instruction that the weather information storing setting procedure is ended, corresponding to "YES" at S115, the control circuit 17 ends the weather information storing setting procedure.

Figure 5:
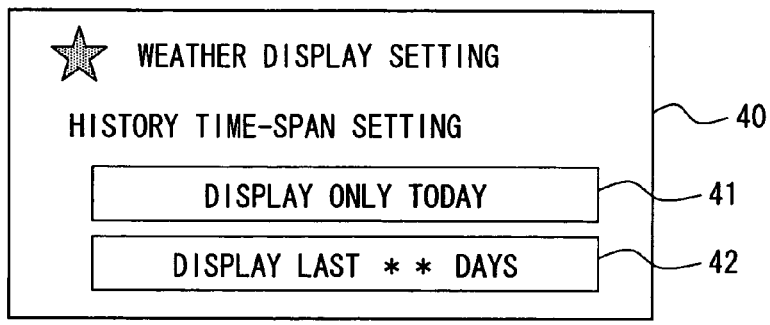
FIG. 5 is a diagram illustrating a weather display setting window.

When the control circuit 17 receives the instruction that the setting associated with weather information storing should be made, corresponding to "YES" at S105, process proceeds to S125. At S125, the control circuit 17 causes the image display unit 12 to display a weather display setting window 40 exemplified in FIG. 5 to inquire of a user whether weather in past (i.e., weather history) is to be stored. The weather display setting window 40 contains a "only today" button 41 and a "past day store" button 42, which are selectable for a user by using the operation unit 13.

At S125, the control circuit 17 waits until one of the buttons 41, 42 is selected. When it is determined that the "only today" button 41 is selected, corresponding to "NO" at S125, process proceeds to S130. When it is determined that the "past day store" button 42 is selected, corresponding to "YES" at S125, process proceeds to S135.

At S130, the control circuit 17 store, in the storage medium of the map data acquisition unit, a setting indicating that, regarding the latest registered memory point, the information about weather only dated today is to be stored. After S130, the control circuit 17 executes the program 100 from the S103 again.

At S135, the control circuit 17 waits for a user input while inquiring of a user about a time span (i.e., holding time in term of days) of the weather history to be stored in term of days. When a user inputs the days using the operating unit 13, process proceeds to S140. At S140, regarding the latest registered memory point, the control circuit 17 allows the storage medium of the map data acquisition unit to store a setting indicating that the time span of the weather history to be stored is between today and the inputted days ago. After S140, the control circuit 17 executes the program 100 from the S103 again.

The control circuit 17 can execute the program 100 for each of registered memory points. Thus, regarding each memory point, the control circuit 17 can determine in line with a user instruction the followings: whether information about weather at the memory point is further to be recorded and displayed (see S105); whether information about weather to be stored includes that in a past day or not (see S125); and how long the time span of the weather history to stored is in term of last days. (see S135). The control circuit 17 stores results of the above determinations in the storage medium of the map data acquisition unit 16 (see S130 and S140).

The weather information storing procedure will be described below. The weather information storing procedure is for storing, if needed, information about weather in accordance with determinations made in the weather information storing setting procedure. The control circuit 17 cyclically or periodically executes a program 200 exemplified in FIG. 6 to perform the weather information storing procedure. For example, the program 200 is executed in five minutes intervals, ten minutes intervals, or one hour intervals.

In execution of the program 200, the control circuit 17 determines at S210 whether the registered memory points include one or more weather storing memory points. Herein, the weather storing memory point is a memory point that is set in the weather information storing setting procedure such that information about weather at the memory point is further to be recorded and displayed in addition to different information about the memory point. When it is determined that the registered memory points includes one or more weather storing memory points, corresponding to "YES" at S210, process proceeds to S220. When it is determined that the registered memory points do not includes a weather storing memory point, corresponding to "NO" at S210, process proceeds to S260.

At S220, a location indicated by the memory point is set. More specifically, the control circuit 17 specifies weather division areas in which weather storing memory points are respectively located. The control circuit 17 may further specify another weather division area located around the weather division area in which the weather storing memory point is located. The control circuit 17 outputs to the weather information reception unit 15 a control signal for request to receive information about the present weather in the specified weather division area. In the above, the weather division area that the memory point is located in is specified based on partition information for weather division areas stored in the map data acquisition unit 16.

The weather information reception unit 15 selectively receives information about present weather in the specified weather division area from the weather information provide apparatus, and outputs the received information to the control circuit 17.

After S220, process proceeds to S230. At S230, the control circuit 17 receives the information about the present weather from the weather information reception unit 15 or waits for a predetermined period (e.g., five minutes) while being not receiving the information about the present weather. Then, process proceeds to S240.

At S240, the control circuit 17 determines whether the information about present weather (i.e., present weather information) is received or not regarding at least one memory point. When it is determined that the present weather information regarding the at least one memory point is received, corresponding to "YES" at S240, process proceeds to S250. When it is determined that the present weather information is not received, corresponding to "NO" at S240, process proceeds to S260.

At S260, the control circuit 17 causes the image display unit 12 to display the present weather information acquired from the weather information reception unit 15, and further causes the storage medium of the map data acquisition unit 16 to record each piece of the acquired present weather information as information about weather of the present time in the corresponding weather storing memory point.

At S250, regarding the weather storing memory point in which the information of the present weather is received, the control circuit 17 organizes the information about weather stored in the storage medium in term of days. More specifically, regarding the weather storing memory point, the information about weather dated today is compared with the information about the present (i.e., newest) weather acquired at S230. If the information about weather dated today and the information about the present (i.e., newest) weather acquired at S230 indicates the same weather, the information about weather dated today is un-changed. If a weather change is indicated by the information about weather dated today and the information about the present (newest) weather acquired at S230, the control circuit 17 changes the date associated with the information about weather dated today so that the data reflects the weather change. Accordingly, the information about weather dated today is updated and the weather change is recorded simply but properly to notify a user of the weather change.

For example, regarding one weather storing memory point, when the information about weather dated today indicates "sunny", and when the acquired information about the latest weather also indicates "sunny", the information about weather dated today is kept to indicate "sunny". In another example, regarding another weather storing memory point, when the information about weather dated today indicates "rainy", and when the acquired information about the latest weather indicates "sunny", the information about weather dated today is changed so as to indicate "change from rainy to sunny". After S250, process proceeds to S260.

At S260, the information about too-much-past weather is removed. That is, regarding each weather storing memory point, the control circuit 17 reads the setting of the time span of the weather history determined in the weather information storing setting procedure. When the stored information about weather includes information about weather dated prior to the weather history time span from the today, the control circuit 17 removes the information about the weather dated prior to the time span from today. Accordingly, it is possible to prevent the information about past weather from infinitely accumulating. After S260, the execution of the program 200 terminates.

The control circuit 17 cyclically executes the above program 200. Thereby, regarding each weather storing memory point (see S210), the control circuit 17 acquires the information about present weather in an area containing a point indicated by the weather storing memory point (see S220, S230). Further, the control circuit 17 provides a user with display of the acquired information about the present weather, and reflects the acquired information about the present weather in the information about weather dated today (S250). Further, the control circuit 17 removes the information of the weather dated prior to the history time span from today (see S260).

The information about the present weather acquired in the above described manners is stored in the storage medium, and thereby the weather history is stored, i.e., the information about weather in different times is accumulated. Since the weather history is classified according to days and since the information about weather in a same day is combined, an amount of required memory can be reduced.

The memory point display procedure will be described below. In the memory point display procedure, information about the registered memory point is displayed and informed in detail to a user. The memory point display procedure is performed in connection with, for example, determination of a navigation destination utilizing the memory point in the guidance route calculation procedure.

When the control circuit 17 receives a signal indicating that the memory point display procedure should be performed, the control circuit 17 performs the memory point display procedure. In the procedure, when the control circuit 17 receives a signal indicative of one memory point specified by a user, the image display unit 12 displays a name, an address, a telephone number etc. of the specified memory point.

Figure 7:
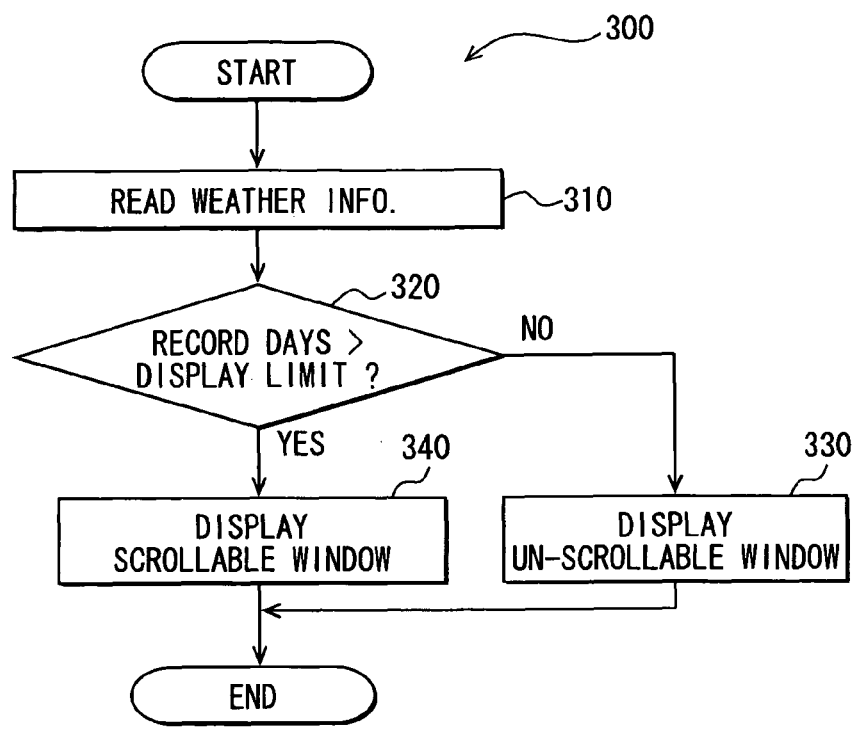
FIG. 7 is a flow chart of a third program executed by the control circuit.

When the specified memory point is the weather record memory point, the control circuit 17 executes a program 300 exemplified in FIG. 7. In execution of the program 300, the control circuit 17 reads at S310 the stored information about weather associated with the weather record memory point and classified according to days.

At S320, it is determined whether the recorded time span of the weather history in the read information exceeds a threshold in term of days. The threshold may correspond to a maximum number of weather information items that the image display unit 12 can display on the screen at one time. When it is determined that the recorded time span of the weather in the read information does not exceed the threshold in term of days, process proceeds to S330. When it is determined that the recorded time span of the weather in the read information exceeds the threshold in term of days, process proceeds to S340.

Figure 8:
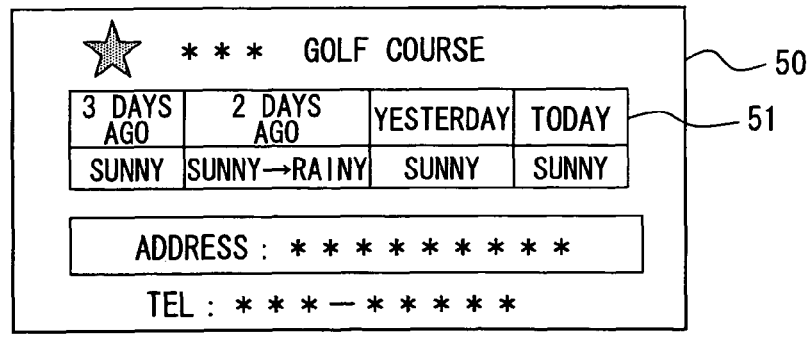
FIG. 8 is a diagram illustrating a second memory point display window.

At S330, the control circuit 17 displays multiple weather information items that represent the information about the weather in a whole recorded time span on a memory point display window 50 of the image display unit 12. Each weather information item may represent the weather in a corresponding date. An example 50 of the memory point display window 50 is shown in FIG. 8. In the example 50, the information about the weather classified according to days is provided by display of weather information items 51, together with the name, address and phone number of the memory point. After S330, the execution of the program 300 is ended.

Figure 9:
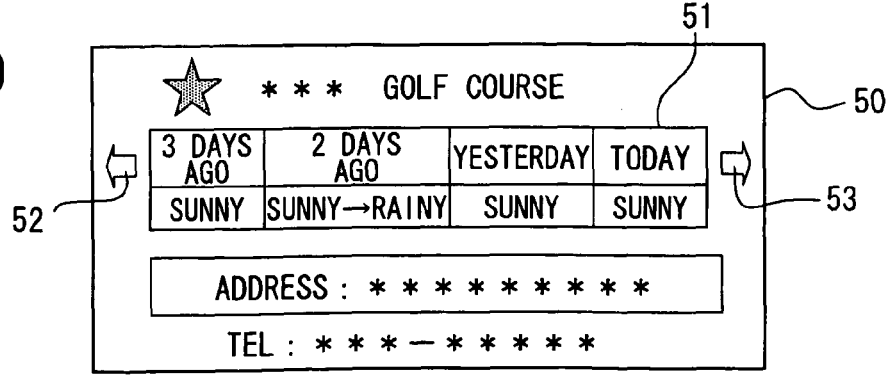
FIG. 9 is a diagram illustrating a third memory point display window.

At S340, the control circuit 17 causes the image display unit 12 to display some of the weather information items 51 classified in days on a memory point display window. Further, the control circuit 17 changes display of the weather information items 51 by scrolling the memory point display window. An example of the memory point display window 50 is exemplified in FIG. 9. In the above example, some of the weather information items 51 classified according to days are displayed together with the name, the address and the phone number of the memory point, and further, a selectable scroll buttons 52, 53 are displayed. When a user selects one of the scroll buttons 52, 53, the memory point display window is scrolled to change the display of the weather information items 51. After S340, the execution of the program 300 is ended.

As described above, the navigation apparatus 1 for a vehicle cyclically acquires the information about latest weather at the weather record memory point. Further, by acquiring the information, the navigation apparatus 1 sequentially stores the information about weather in past (i.e., non-latest weather) in the storage medium of the map data acquisition unit 16. Further, the navigation apparatus 1 causes the image display unit 12 to notify the information about weather in past stored in the storage medium. That is, the navigation apparatus 1 can provide information about a weather history of a certain point.

Accordingly, of the repeatedly acquired information about weather at the memory point, it is possible to store information about weather in past and notify a user of at least the information about weather in past. Therefore, it is possible to support user's need that a user would like to confirm past weather.

For example, when a user wonders which ski resort should be selected as a destination from among multiple ski resorts, a user may would like to know a last one-week weather history of ski resorts to make sure a slope condition of each ski resort. For a case of the above situation, it is possible to register each ski resort as a weather record memory point such that the information about the last one week weather at the weather record memory point is to be recorded. Thereby, in determining the destination through specifying the memory point, it becomes possible to check which ski resort have a good condition by reading the last one-week weather histories of the ski resorts.

In another example, before going to a golf course, a user may would like know yesterday weather of the golf course to make sure whether the course is in a wet condition or not. For a case of the above situation, it is possible to register each golf course as a weather record memory point such that information about yesterday weather at the weather record memory point is to be recorded. Thereby, in determining the destination through specifying the memory point, it becomes possible to check which golf course has a good condition by reading the yesterday weather information in the golf courses.

Further, of the information about the present weather in multiple areas provided via the weather information provider apparatus, the navigation apparatus 1 for a vehicle stores the information about weather in some of the multiple areas in the storage medium, so that the weather information in the some of the multiple areas respectively corresponds to the weather information at some points. The above manner can reduce a mount of data to be stored and save a memory space for the data, compared to a case of recording all information about weather in the multiple areas provided via the weather information provide apparatus.

Further, such some of the multiple areas contains points specified by a user as record target points. The record target point, i.e., memory point, is a user's point of interest. Thus, by limiting the information about the weather to be recorded to that at such points of interest, it is possible to reduce an amount of data to be recorded with the stored information being kept useful.

Further, regardless of the present position of the subject vehicle, the navigation apparatus 1 receives and stores information about weather in a particular area as corresponding to information about weather at a record memory point, even if the area is close to or distant from the subject vehicle.

According to the above manners, it is possible to acquire and store information about weather in past, independently from the position of the subject vehicle. That is, while storing information about a weather history of an area distant from the present position of the subject vehicle, the navigation apparatus 1 can store information about a weather history of an area containing the present position of the subject vehicle.

Further, the navigation apparatus 1 receives information about weather not only to store information about weather in past. For example, when the navigation apparatus 1 searches facility data in the above-described manners (3) to (5) of the navigation route calculation procedure, the control circuit 17 may display information about present weather in all of the search hit facilities and then may destroy the information about the present weather. In such a case, the navigation apparatus 1 may record, of the previously acquired information about weather at multiple points, information about weather information at particular points, in order to store information about weather histories. The above manner can reduce an amount of data to be stored.

(Modification)

The above embodiment can be modified and extended in various ways. Examples of modifications are described below.

In the above embodiment, some of the memory points are set to weather record memory points such that information about weather histories of the weather record memory points are to be stored and displayed. Alternatively, regarding a point that had been set to a destination, information about a weather history may be further stored and displayed. Alternatively, regarding a particular landmark (e.g., an outdoor resort), information about a weather history may be further recorded and displayed.

Alternatively, when it is unnecessary to reduce an amount of data to be stored, all information about the present weather in areas provided via the weather information provider apparatus may be record, stored and displayed as information about weather in past.

In the above embodiment, in the weather information storing setting procedure (cf. FIG. 3), the control circuit 17 determines the time span of the weather history to be stored in accordance with a user operation. Alternatively, the control circuit 17 may automatically determines the time span of the weather history in accordance with types of memory points. For example, the time span for a golf course may be set to last one day, and that for a ski resort may be set to last one week.

The image display unit 12 may notify information about a weather history, or the speaker unit 14 may notify the information about a weather history through a sound output.

Information about a weather history to be stored and displayed may be classified according to days, times or the like.

Data required to be updated, such as data associated with information about a weather history, may be stored in the storage medium of the map data acquisition unit 16, or stored in another storage medium that can keep the data even if a main power source for the navigation apparatus 1 stops power supply to the storage medium. Such a storage medium may be a flash memory, an EEPROM, a back up RAM, or the like.

In the above embodiment and its modifications, the image display unit 11 and the speaker unit 14 can function as a notification unit. The map data acquisition unit 16 having the storage medium can function as a storage medium unit. The control circuit 17 for executing the steps S220 and S230 in the program 200 can function as an acquisition section or means.

Figure 6:
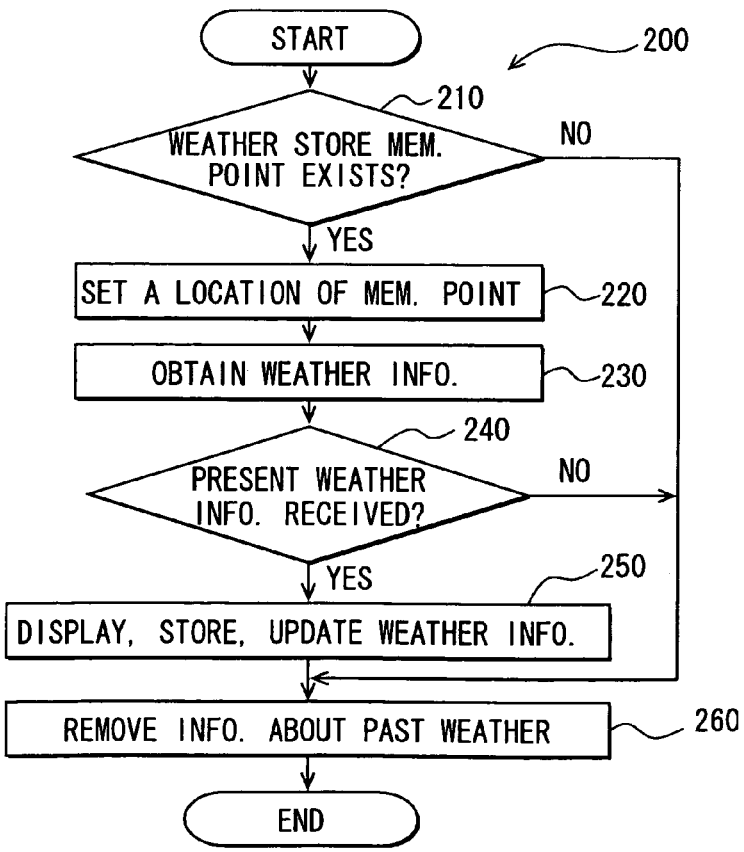
FIG. 6 is a flow chart of a second program executed by the control circuit.

In other words, steps implemented in a machine readable program for allowing the control circuit of the navigation apparatus 1 to function as the acquisition section or means corresponds to the step S220 and S230 exemplified in FIG. 6. The control circuit 17 for executing the steps S250 and S260 in the program 200 can function as a record section or means. In other words, steps implemented in a machine readable program for allowing the control circuit of the navigation apparatus 1 to function as the record section or means corresponds to the step S250 and S260 exemplified in FIG. 6. The control circuit 17 for executing the program 300 can function as a notification section or means. In other words, machine readable program for allowing the control circuit of the navigation apparatus 1 to function as the notification section or means corresponds to the program 300 exemplified in FIG. 8.

While the invention has been described above with reference to various embodiments thereof, it is to be understood that the invention is not limited to the above described embodiments and construction. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of processes, steps, or means explained in the above can be achieved as a software section or unit (e.g., programs executed by the control circuit 17) and/or a hardware section or unit (e.g., FPGA: Field Programmable Gate Array, which can be programmed so to have a circuit configuration), including or not including a function of a related device.

Furthermore, the software section or unit or any combinations of multiple software sections or units can be included in a software program, which can be contained in a computer-readable storage media or can be downloaded and installed in a computer via a communications network.

What is claimed is:

1. A weather information notification apparatus mounted to a vehicle, comprising:
    an acquisition section that automatically and cyclically acquires information about weather at a plurality of memory points, each memory point being specified and registered by a user such that the information about weather at the each memory point is to be stored;
    a record section that records and stores the acquired information about weather at the plurality of memory points in an external storage medium unit; and
    a notification section that causes an external notification unit to notify information about non-latest weather at the plurality of memory points, the information about non-latest weather at the each memory point being a piece of the information about weather at the each memory point stored in the external storage medium unit.

2. The weather information notification apparatus according to claim 1, wherein:
    the record section stores information about weather in a predetermined area as the information about weather at the each memory point in the external storage medium unit; and
    the information about weather in the predetermined area is a piece of information about weather in multiple areas, the information about weather in the multiple areas being provided via an external weather information provider apparatus.

3. The weather information notification apparatus according to claim 2, wherein:
    the each memory point is specified by the user as a weather record target point; and
    the predetermined area contains the weather record target point.

4. The weather information notification apparatus according to claim 1, further comprising:
    a control circuit configured to set a specific time span for each memory point;
    wherein the external storage medium unit stores the information about weather at the each memory point for the specific time span, and
    wherein the control circuit determines the specific time span in accordance with type of memory point.

5. A machine readable program for allowing a computer of a weather information notification apparatus to function as:
    an acquisition section that automatically and cyclically acquires information about weather at a plurality of memory points, each memory point being specified and registered by a user such that the information about weather at the each memory point is to be stored;
    a record section that records and stores the acquired information about weather at the plurality of memory points in an external storage medium unit; and
    a notification section that causes an external notification unit to notify information about non-latest weather at the plurality of memory points, the information about non-latest weather at the each memory point being a piece of the information about weather at the each memory point stored in the external storage medium unit.

6. An in-vehicle navigation apparatus, comprising:
    a storage medium unit;
    a notification unit; and
    a control circuit including:
        an acquisition section that automatically and cyclically acquires information about present weather in multiple areas respectively containing memory points of interest, the memory points of interest being previously selected by a user, and the information about present weather in the multiple areas being provided from an external weather information provider apparatus;
        a record section that records the acquired information about present weather for the multiple areas in the storage medium unit, so that a weather history at the memory points of interest is stored in the storage medium unit; and
        a notification section that causes the notification unit to provide the user with the weather history at any of the memory points of interest stored in the storage medium unit, thereby to assist the user to select a navigation destination.

* * * * *